US012602354B1

(12) United States Patent
Camp et al.

(10) Patent No.: US 12,602,354 B1
(45) Date of Patent: Apr. 14, 2026

(54) FULL FIDELITY STORAGE OF METRIC TIME SERIES DATA

(71) Applicant: Cisco Technology, Inc., San Jose, CA (US)

(72) Inventors: Jay Robert Camp, Raleigh, NC (US); Bogdan Cristian Drutu, Menlo Park, CA (US); Mahdi Ben Hamida, Redwood City, CA (US); Michael Margulis, Danville, CA (US); Ramakrishnan Hariharan Chandrasekharapuram, San Jose, CA (US); Archanan Padmasenan, Sammamish, WA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/103,994

(22) Filed: Jan. 31, 2023

(51) Int. Cl.
 *G06F 16/16* (2019.01)

(52) U.S. Cl.
 CPC ................................. *G06F 16/162* (2019.01)

(58) Field of Classification Search
 CPC ........... G06F 16/24568; G06F 11/3082; G06F 11/3452
 See application file for complete search history.

(56) References Cited

U.S. PATENT DOCUMENTS 7,937,344 B2 5/2011 Baum et al.
8,112,425 B2 2/2012 Baum et al.

8,751,529 B2 6/2014 Zhang et al.
8,788,525 B2 7/2014 Neels et al.
9,215,240 B2 12/2015 Merza et al.
9,286,413 B1 3/2016 Coates et al.
10,127,258 B2 11/2018 Lamas et al.
2003/0081935 A1* 5/2003 Kirmuss ................... H04N 7/18
 386/327
2016/0092484 A1* 3/2016 Finkler ................. G06F 16/258
 707/715
2018/0341706 A1* 11/2018 Agrawal ................. G06F 16/71
2019/0098106 A1 3/2019 Mungel et al.
2019/0138419 A1* 5/2019 Poghosyan ......... G06F 11/3006
2019/0138420 A1* 5/2019 Harutyunyan ........ G06F 11/301
(Continued)

OTHER PUBLICATIONS

Splunk Enterprise 8.0.0 Overview, available online, retrieved May 20, 2020 from docs.splunk.com.
(Continued)

*Primary Examiner* — Dennis Truong
(74) *Attorney, Agent, or Firm* — Kilpatrick Townsend & Sockton LLP

(57) ABSTRACT

Described herein are techniques for aggregating metric time series data upon ingestion, such as prior to intake, analysis, or processing by a data quantizer system. The disclosed techniques can transforming metric time series data into aggregated metric time series data, optionally with reduced complexity or dimensionality, while retaining various statistical information characteristic of the original source metric time series data. The aggregated metric time series data can be used in the same way as the original source metric time series data or other metric time series data, such as for processing or generating streaming analytics data or triggering events or notifications by a data quantizer system.

19 Claims, 3 Drawing Sheets

100 —

(56) References Cited

U.S. PATENT DOCUMENTS

| | | | | |
|---|---|---|---|---|
| 2020/0167360 | A1 * | 5/2020 | Rath | ...................... G06F 16/252 |
| 2020/0257680 | A1 * | 8/2020 | Danyi | ................. G06F 11/3495 |
| 2022/0100771 | A1 * | 3/2022 | Pang | ................... G06F 16/2477 |
| 2023/0418467 | A1 * | 12/2023 | Ezrielev | ................. G06F 3/067 |

OTHER PUBLICATIONS

Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Carraso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

100

DATA SOURCES
105

TIME SERIES DATA

ROUTING SYSTEM
110

FULL FIDELITY
STORAGE SYSTEM
115

DATA QUANTIZER
SYSTEM
140

QUANTIZER
DATA STORAGE
170

CLIENT
SYSTEM
180

FULL FIDELITY STORAGE OF METRIC TIME SERIES DATA

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data").

In some examples, machine data may be generated by software or based on hardware parameters associated with a computing system on which the software is operating (e.g., processor usage). For example, machine data can include log data, performance data, diagnostic data, metrics, tracing data, or any other data that can be analyzed to diagnose equipment performance problems, monitor user interactions, and to derive other insights.

Monitoring certain machine data in real-time or near real-time may be desirable for some applications. For example, it may be useful to monitor performance data or metrics, such as processor usage or memory usage, in real-time to allow for identification of problems as they occur. Tracking machine data in real-time or over various time periods (e.g., hours, days, weeks, months) can also allow for identification of patterns and can be useful for scaling resources, for example. In some cases, it can be useful to consolidate or compile machine data generated in real-time (e.g., every second) over longer periods (e.g., minutes, hours, days, etc.) to allow for easier visualization and interpretation or analysis of the machine data.

BRIEF DESCRIPTION OF THE DRAWINGS

Illustrative examples are described in detail below with reference to the following figures.

DETAILED DESCRIPTION

Figure 1:
FIG. 1 provides a block diagram of an example system for collecting, analyzing, processing, and storing time series data.

Techniques, which may be embodied herein as systems, computing devices, methods, algorithms, software, code, computer readable media, or the like, are described herein for storing and processing metric time series data in large quantities, without limitation, for use by a data quantizer system. The disclosed techniques can provide efficiency in storing large quantities of metric time series data in a way that allows certain metric time series data to be immediately processed by a data quantizer system while allowing other metric time series data to be stored in its original form, or a compressed version or representation thereof, for later retrieval and processing by the data quantizer system when requested. For example, the original data points of the metric time series data can be stored in a long-term, low-cost, or low resource usage data storage system, while a subset of the metric time series data is processed on a more immediate basis by a data quantizer system. The stored metric time series data can be used in the same way as the original source metric time series data or other metric time series data, such as for processing or generating streaming analytics data or triggering events or notifications by a data quantizer system.

It will be appreciated that the above-described aspects may be implemented as methods, systems, computing devices, and/or non-transitory computer readable media. For example, a system or computing device may comprise one or more processors and a non-transitory computer-readable storage medium having stored thereon instructions that, when executed by the one or more processors, may cause the one or more processors to perform operations, such as operations corresponding to methods described herein. In another example, a non-transitory computer-readable storage medium may comprise or have stored thereon instructions that, when executed by the one or more processors, may cause the one or more processors to perform operations, such as operations corresponding to methods described herein.

The term embodiment and like terms are intended to refer broadly to all of the subject matter of this disclosure and the claims below. Statements containing these terms should be understood not to limit the subject matter described herein or to limit the meaning or scope of the claims below.

Embodiments described herein are useful for analyzing, visualizing, storing, organizing, or otherwise using machine data, such as for purposes of determining the state or condition of a system, such as to trigger an event based on the state or condition of the system or other conditions. For example, machine data can be raw machine data that is generated by various components in IT environments, such as servers, sensors, routers, mobile devices, Internet of Things (IoT) devices, etc. Machine data can include log data, network packet data, sensor data, application program data, error log data, stack trace data, performance data, metrics, tracing data, diagnostic data, and many other types of data.

The machine data may be organized as time series data, where each data point may have or be associated with one or more times or timestamps, such as a raw time, a receipt time, a publication time, etc., one or more values or metrics, such as a numerical measurement that can change over time (e.g., processor usage, network latency, total transactions or transactions per unit time, etc.) or other more complex information, such as a histogram, for example, and optionally metadata, such as one or more identifiers, dimensions, tags, labels, or other custom properties that may indicate characteristics of or associated with the data that may or may not change over time (e.g., a metric name or metric type of the data point, a server IP address or hostname, etc.). In some implementations, a set of time series data associated with the same metric name and/or including the same or particular values for dimensions may be referred to as a metric time series or MTS. Metric time series and other time series data may be used for various applications, such as for identification of patterns or anomalies.

In some examples, it may be desirable to monitor multiple streams of metric time series data from multiple sources and transform the data, such as for purposes of alerting or triggering on the original or transformed data or to visualize the original or transformed data, such as to evaluate anomalies, understand patterns, or alter resource usage, for example. In some examples, many sources of metric time series data may be available, and in some cases, the utility of such metric time series data may not be immediately apparent. For example, while some metric time series data may have immediately evident uses (e.g., to monitor performance of a system or service on an ongoing basis, trigger alerts, etc.), other metric time series data not having an already established utility may be identified at a later or future time for some new utility (e.g., to monitor performance of a new system or service or for investigatory purposes to identify information related to an anomaly). In these or other situations, it may be desirable to store the metric time series data not having an already established utility in the event a utility is later determined for the metric time series data. By storing the original data points of the historical metric time series data, it is possible to look backwards in time into the metric time series data, such as for purposes of identifying new events, anomalies, or other information that may have not been previously evaluated, or for any other evaluation or investigatory purposes. Accordingly, it can be desirable to store any and/or all available metric time series data, at least for some duration, in order to allow later uses of the metric time series data with a historical lookback.

However, storage of large quantities of metric time series data may have one or more operational constraints. For example, there may be constraints on the amount of metric time series data that can be stored, such as based on storage capacity, storage cost, durational limits, or other limitations. Optionally, some metric time series data may be stored in aggregated form to reduce data storage requirements. In some examples, aggregation may occur prior to analysis by a data quantizer system. Examples of such aggregation are described in U.S. patent application Ser. Nos. 18/094,798 and 18/094,801, both filed on Jan. 9, 2023, and hereby incorporated by reference. In some examples, aggregation may take place by analysis at a data quantizer system. For example, in the case of analysis of metric time series data by a data quantizer system, aggregation in the form of roll-up data can allow storage of information included in metric time series data, but this may not allow access to the finest granularity of information present in the original metric time series data, as some information may be lost, masked, or otherwise limited by the aggregation or roll-up process. For processing by a data quantizer system, the aggregated or roll-up data may be periodically processed to generate and store coarser and coarser data points as the data ages. For example, for data initially generated on a millisecond basis, data aged for a few days may be stored as 1 second roll-up data, data aged for a week may be stored as 30 second roll-up data or 1 minute roll-up data, data aged for a month may be stored as 1 hour roll-up data or 6 hour roll-up data, etc. It will be appreciated that this is a non-limiting example showing how aged roll-up data may change to coarser granularity over time and that other storage configurations for roll-up data may be used.

Certain forms of data storage, however, can be useful for overcoming operational constraints and allow for storing more metric time series data and/or for longer durations in an efficient and operationally suitable manner. Such storage systems may be referred to herein as "cold storage" systems. For example, in some cases, storing data in or on blob storage systems may reduce the cost associated with storing the data. The techniques described herein allow for usage of these or other types of cold storage systems to store large amounts of metric time series data, such as in the original, unaggregated form, while maintaining some subset of the metric time series data in more readily accessible form in higher-cost data storage, such as in the form of aggregated or rolled-up data.

In some cases, these or other types of cold storage systems can be useful to efficiently store the metric time series data, such as in compressed or reduced form. This compression or data reduction may, in some examples, require longer operations for read back of the metric time series data (e.g., as compared to other storage systems), such as due to operations associated with identifying the appropriate compressed storage file/block and decompression of the storage file/block to extract the original metric time series data. In cases where such a data read latency is operationally suitable, this can allow for the operational limits to be overcome and large amounts of metric time series data can be stored for at least some historical period, allowing the later processing of the stored metric time series data by the data quantizer system.

Advantageously, the disclosed techniques can operate independent of a data quantizer system, allowing existing data quantizer systems to have extended functionality for access to other metric time series data beyond that initially taken in and analyzed by the data quantizer system, such as by storing original metric time series data points in cold storage and retrieving and directing the original metric time series data to the data quantizer system, as needed. In some cases, however, access to the other metric time series data from cold storage may be delayed and/or require some identification and processing, for example, before the metric time series data can be directed to the data quantizer system, such as due to the storage configuration utilized, as noted above.

In some cases, a routing system may be used to initially direct a subset of all received metric time series data from various data sources to a data quantizer system. In some cases, various filtering operations may be used to identify these metric time series data to direct to the data quantizer system. Such filtering operations may, for example, identify a metric time series based on metric information, existing use in active monitoring or event triggering, or other criteria. All, a majority, or a subset of the metric time series data may also be directed by the routing system to a system for storing the metric time series data in cold storage, allowing the original metric time series data to be stored for later use, where desired. In some cases, all the metric time series data are routed for storage in cold storage. In other cases, the metric time series data that are not directed to the data quantizer system are routed for storage in cold storage. Additional details regarding the routing, storage in cold storage, and read back of metric time series data are described below.

1.0. Data Stream Quantization

FIG. 1 shows an overview of an example environment 100 for collecting, analyzing, processing, and storing time series data (e.g., metric time series data). Metric time series data may be generated in real time by various data sources 105, which may be distributed across various networks. These data sources 105 may transmit the metric time series data to a routing system 110, such as over a network, which may include a private network, a wide area network, or a public network (e.g., the Internet). In some cases, the routing system 110 may be at a location remote from the data sources 105, though in some cases the routing system 110 and one or more data sources 105 may be at a common location, and optionally on the same local network. The metric time series data may include data points that are generated on a repeated basis, which may be a periodic basis (e.g., every second, every minute, etc.) or on a non-periodic basis (e.g., when a generation threshold is reached, upon system reboot, based on the occurrence of a non-periodic event, etc.).

The routing system 110 can process the metric time series data, such as to direct metric time series data to various systems or components, or for other operations, such as for various data aggregation or reduction, in some cases. In FIG. 1, routing system 110 is shown directing metric time series data to a full fidelity storage system 115 and a data quantizer system 140. In some cases, certain metric time series data, or portions thereof, may be identified to be not forwarded to another system, which may be referred to herein as dropping the non-forwarded metric time series data. Advantageously, the operational costs associated with storing metric time series data at full fidelity storage system 115 may be low enough that it is possible to, at least for some duration, store all or a large majority of received metric time series data from data sources 105 and avoid dropping any metric time series data or instead dropping a small subset of the received metric time series data. Full fidelity storage system 115 may include various components associated with storing and retrieving metric time series data, as described in further detail below.

Although illustrated in FIG. 1 as distinct systems, some embodiments incorporate routing system 110 and full fidelity storage system 115 as parts of a common system, such as where routing system 110 is a component of full fidelity storage system 115. Other configurations are possible, such as where routing system 110 and data quantizer system 140 are parts of a common system, or where routing system 110, full fidelity storage system 115, and data quantizer system 140 are parts of a common system or device, or where routing system 110, full fidelity storage system 115, and data quantizer system 140 are all parts of different systems or devices.

The data quantizer system 140 may include various subsystems or components, such as an intake system, a metadata system, a time series storage, a metadata storage, an analytics system, or the like. These and other components of the data quantizer system 140 may be present as or in a single computing system or may be separate and individually distributed components among a distributed computing system, including where the different components may be physically present in separate locations. As illustrated, data quantizer system may store quantized or aggregated metric time series data, metadata, or the like in quantizer data storage 170. Although illustrated separately, quantizer data storage 170 may optionally be a component of data quantizer system 140

The data sources 105 may be or comprise any suitable computing devices, sensors, software systems, etc., that can generate or collect machine data or other data and transmit the machine data or other data in the form of metric time series data to the routing system 110, such as over one or more network connections. The data sources 105 can include hosted or containerized software or services operating on cloud infrastructure, where computing resources are shared between multiple hosted software or services. The data sources 105 can be present in a single location or data center or distributed among various data centers, which may be located remotely from one another.

The metric time series data generated by the data sources 105 may include one or more data points. Each data point can include or be associated with a raw time that can correspond to a timestamp indicating when a data point is generated by a data source 105, a time at which a data point is transmitted by a data source 105, and/or some other time assigned to the data point by the data source 105. Each data point can also include or be associated with one or more metadata categories, metadata values, dimension categories, and/or more dimension values. Each data point can also include or be associated with one or more numeric values, also referred to herein as metric values, which can optionally correspond to or represent a quantification of some machine data, sensor data, performance data, etc.

The data quantizer system 140 may intake metric time series data using an intake system. For example, such an intake system can receive the metric time series data from the routing system 110, and optionally assign a receipt time to the data points based on a time at which the data points are received, which is generally different from a raw time associated with the data points, since there is usually some latency associated with transmitting the data point to the data quantizer system 140 over a network and/or processing by routing system 110. In many cases, the raw time may be the time used for analysis of the data, as this can represent the time at which the data point is generated at the associated data source. In some cases, however, a raw time and a receipt time may be the same, such as if network latency is low, ingestion processing time is short, and/or if the precision of the raw time and/or receipt time is larger than the network latency and any processing time (e.g., when the raw time and the receipt time have a precision of 1 second and network latency and processing time is less than 100 ms). The intake system may remove extraneous information from the metric time series data, as desired, and may adjust or format the metric time series data to a standard format used by the data quantizer system 140, if not already so formatted.

A metadata system component of data quantizer system 140 may optionally create or assign metadata (e.g., identifiers, dimensions, tags, labels, or the like), to the data points, such as if such metadata is not already assigned or present in the data points or if the metadata system is otherwise assigned to or has rules indicating such metadata is to be assigned. The metadata system may retrieve from or store metadata information to a storage system, such as data quantizer storage 170. Optionally, an index or rules for associating various metadata with various metric time series data or components thereof may be stored in data quantizer storage 170. It will be appreciated that the index or rules for associating various metadata with various metric time series data or components thereof may be stored in any suitable storage system (e.g., a metadata storage system) or location, such as in full-fidelity storage system 115, in both full-fidelity storage system 115 and data quantizer storage 170, or elsewhere.

Data quantizer system 140 may process received data points so as to transform the data values in the received data points to roll-up data points including quantized values associated with one or more regular time intervals, such as using a roll-up system. The regular time intervals may be as small as time intervals associated with the received data points but may also be larger, such that multiple values for multiple data points can be combined to generate a quantized value.

For example, the received data points may be associated with a time interval of 0.1 seconds, such that 10 data points are received by data quantizer system 140 each second; the roll-up data points may be generated for every 1 second, every 5 seconds, every 15 seconds, every minute, etc., on an ongoing basis. Assuming all data points are received and included in the combination for generating roll-up data points, each 1 second roll-up data point may have a quantized value generated from values for 10 data points. Similarly, each 5 second roll-up data point may have a quantized value generated from values for 50 data points, each 15 second roll-up data point may have a quantized value generated from values for 150 data points, and each minute roll-up data point may have a quantized value generated from values for 600 data points. When combining values from multiple data points to generate a quantized value for a roll-up data point, any desirable technique may be used. In some cases, the quantized value may correspond to a sum of the data values. In some cases, the quantized value may correspond to a statistical measure of the data values, such as an average or standard deviation or percentile distribution. In some cases, a formula or algorithm may be used for computing quantized values from a plurality of data values.

Without limitation, metric time series data may be stored to quantizer data storage 170, for example by data quantizer system or a component thereof, which may store the metric time series data in the form of roll-up data, for example.

In some cases, it may be desirable to transform, combine, or associate different time series with one another, such as for various analytics purposes. Data quantizer system 140 may be used to generate, aggregate, transform, or otherwise combine data from one or multiple different time series to generate analytics data (e.g., a time series of transformed, aggregated, or combined metric time series data that may optionally be grouped over a common attribute, such as a metadata attribute). Optionally, data quantizer system 140 may include an analytics system for such purposes, or for other purposes including monitoring various metric time series data such as for purposes of detecting an event or identifying an anomaly. Optionally, the metric time series data used to generate analytics data may include roll-up data points as generated using a roll-up system, as described above. In some examples, one metric time series may include data points with values for processor usage for a particular processor core and a second metric time series may include data points with values for processor usage for another processor core, and it is desired to determine an overall total or average processor core usage. As another example, multiple metric time series (e.g., including roll-up data at a fixed time interval) may include data points for processor usage for various processors in a particular data center and it may be desired to have a metric time series including an overall total or average processor usage for the data center. The data quantizer system, or a component thereof (e.g., an analytics system), 140 can identify the metric time series that include metadata identifying the particular data center and determine a sum or average of the processor usage for all the identified metric time series on a per time interval basis to generate analytics data comprising an aggregated metric time series representing the overall total or average processor usage for the data center. In some examples, the analytics system 145 may optionally receive input or an analytics data request identifying a particular transformed, combined, or aggregated metric time series to generate and then generate appropriate analytics data in response. As metric time series data from data sources 105 is received by routing system 110 and data quantizer system 140 on a continuing basis, the above-described aspects may be performed repeatedly and optionally in real-time as additional data points are received.

One or more client systems 180 can be used to facilitate visualizing and monitoring conditions, metric time series data, including aggregated metric time series data, and optionally including data quantized into roll-up data points by the data quantizer system, and/or other machine data associated with or generated by the various data sources 105, such as in the form of analytics data. In some cases, the data quantizer system 140, or a subsystem or component thereof (e.g., an analytics system) can enable identification of problems, anomalies, or undesired performance associated with one or more of the data sources 105 in real-time or near real-time, allowing for troubleshooting and resolution of such issues while minimizing downtime, such as by generating alerts. For example, the metric time series data may comprise a processing load on each of the data sources 105, such as data sources that correspond to a plurality of servers distributed across a plurality of data centers. The data quantizer system 140 can enable correlation and visualization of analytics data representing different servers in different data centers, for example, and such processing usage on a per-data center basis can be monitored or explored, for example, by one or more users associated with client systems 180.

The data quantizer system 140 may provide analytics data to software applications executing on client systems 180 that permits users to interact with the analytics data, such as for purposes of selection of data to be included in the analytics data (e.g., based on a metadata filtering query) or to visualize the data, specification or assignment of metadata, identification of alert conditions or triggers, on-demand report generation, selection of automatic report generation based on trigger or threshold conditions, or the like. In some embodiments, the software application can be an internet browser, which may include client-side code (e.g., Java Script) for accessing the data quantizer system 140. In some embodiments, the software application is a proprietary application developed for interacting with the data quantizer system 140.

The data quantizer system 140 and/or the routing system 110 can optionally store metric time series data from one or data sources, aggregated metric time series data, rolled-up metric time series data, or other time series data to quantizer data storage 170, which may be remote or separate from data quantizer system 140, or it may be included as a component of data quantizer system 140. Client system 180 can optionally retrieve data from quantizer data storage 170 or facilitate retrieval of data from quantizer data storage 170, such as by data quantizer system 140, such as for purposes of visualizing the retrieved data.

2.0. Full Fidelity Storage of Metric Time Series Data

Figure 2:
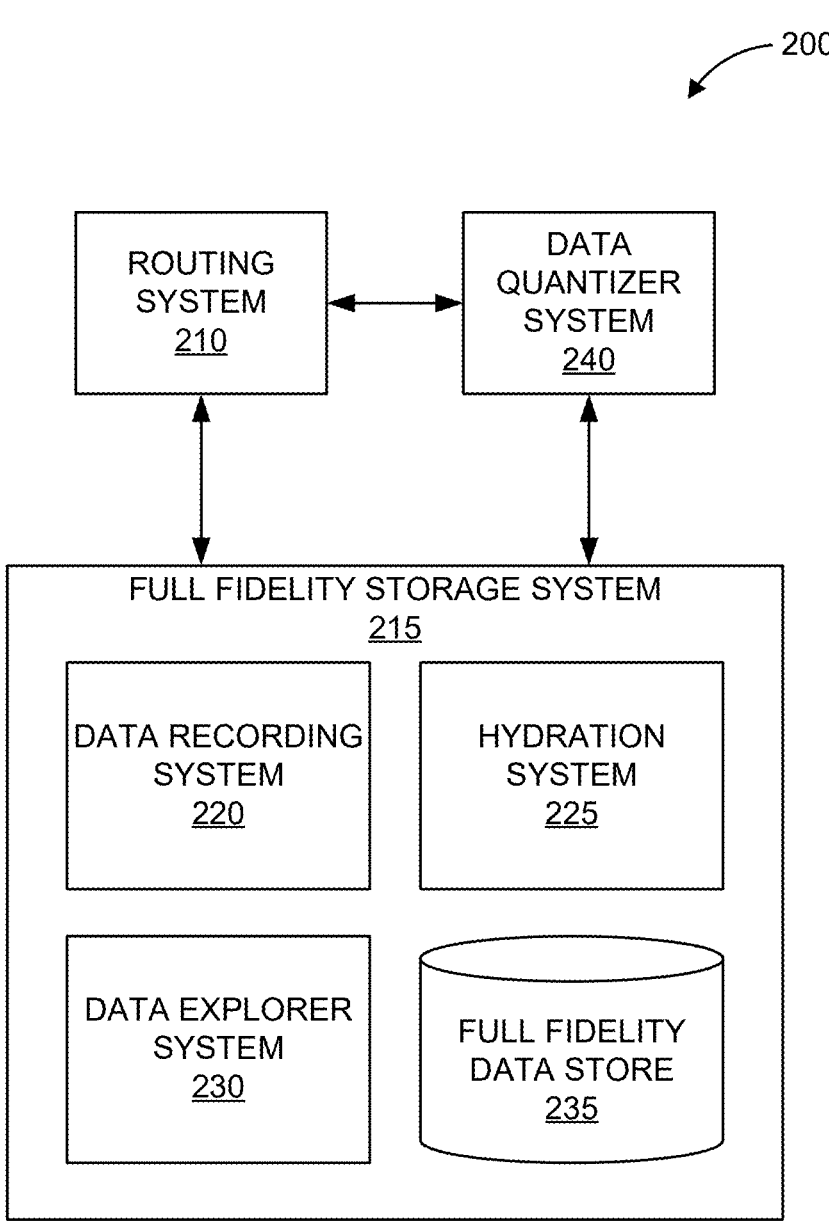
FIG. 2 provides a block diagram of an example system for full fidelity storage of metric time series data.

Full fidelity storage systems can include various systems or components to facilitate storing and retrieving data from data sources and forwarding data to appropriate other systems, such as a data quantizer system as described above. FIG. 2 shows an overview of an example environment 200, such as for collecting, routing, storing, retrieving, and/or otherwise processing metric time series data. Specifically, FIG. 2 shows a routing system 210 providing an interface between various client data sources (not shown in FIG. 2), a full fidelity storage system 215 and data quantizer system 245. Routing system 210 may be the same as or different from routing system 110 depicted in FIG. 1. Full fidelity storage system 215 may be the same as or different from full fidelity storage system 115 depicted in FIG. 1. Data quantizer system 240 may be the same as or different from data quantizer system 240 depicted in FIG. 1.

Full fidelity storage system 215 comprises a data recording system 220, a hydration system 225, a data explorer system 230, and a full fidelity data store 235. From the perspective of the data sources, metric time series data are sent to the data quantizer system 240, with the routing system 210 (optionally invisibly) providing routing of certain metric time series data to the data quantizer system and routing of other or all metric time series data to the full fidelity storage system 215. From the perspective of data quantizer system 240 and full fidelity storage system 215, metric time series data are received from routing system 210 as an intermediary for the data sources, such as to collect, filter, route, and/or pre-process certain metric time series data. In this way, routing system 210 acts as an interface with data quantizer system 240 and full fidelity storage system 215 for data sources 205 and so the use of the filtering, routing, storage, and processing techniques described herein and provided by routing system 210 and full fidelity storage system 215 may be transparent to data sources 205 and data quantizer system 240, meaning no programmatic changes may be needed at data sources 205 and/or at data quantizer system 240 for use of the disclosed techniques.

Within routing system 210, received metric time series data may be subjected to filtering, such as to identify which metric time series data are to be sent to the data quantizer system 240 and/or which metric time series data to be sent to the full fidelity storage system 215. In some cases, the filter criteria may identify a particular dimension or metadata value, such that the matching metric time series data including the particular dimension or metadata value may be flagged for immediate direction to the data quantizer system 225. In some cases, all received metric time series data at routing system 210 may be directed to the full fidelity data storage system 215. In other cases, routing system 210 may filter the metric time series data sent to full fidelity data storage system 215, such as to send to full fidelity data storage system 215 those metric time series data that are not sent to the data quantizer system 240, or to drop certain metric time series data such that they are sent to either full fidelity data storage system 215 or data quantizer system 240. Optionally, the various filter criteria used for filtering by routing system 210 may be predefined, obtained from a remote system, or assigned according to received input (e.g., user input). Optionally, the filter criteria may be dynamically generated, such as based on usage patterns.

Metric time series data that are identified for routing to full fidelity data storage system 215 can be further processed and stored, such as in full fidelity data store 235, according to the various techniques described herein. For example, metric time series data may be received at data recording system 220 of full fidelity storage system 215. Data recording system 220 can collect and/or buffer metric time series data for a period of time, such as may be referred to herein as a buffering window, before such metric time series data is stored to full fidelity data store 235. For example, the buffering window can correspond to any suitable length of time (e.g., from 30 seconds to 10 minutes or more, such as 1 minute, 2 minutes, 3 minutes, 4 minutes 5 minutes, 10 minutes, 15 minutes, etc.), and represents a time window during which metric time series data are collected and/or held in temporary storage by data recording system 220. After or upon expiration or completion of the buffering window, the data recording system 220 may record the metric time series data to the full fidelity data store 235.

In some examples, recording the metric time series data comprises packaging the data points into one or more parquet or column-oriented files, which may also be referred to as column-based files. In some examples, the parquet or column-oriented files can include a different ordering or distribution of the individual data points than that received by the full fidelity data storage system 215, which may be useful for compilation the data points for storage as a binary object in a blob storage system. In some examples, the binary object containing the parquet or column-oriented files may correspond to a compressed file, compressed according to any suitable binary compression algorithm. As different metric time series data are received in different buffering windows, different parquet or column-oriented files can be generated and stored to the full fidelity data store 235 as different binary objects.

Advantageously, collecting metric time series data during a buffering window and/or packaging into parquet or column-oriented files may allow for enhancement of the compressibility of the metric time series data, allowing reduction of the data storage requirements for the metric time series data. In many cases, metric time series data received at the data recording system 220 can include one or more shared characteristics with other metric time series data (e.g., metadata, dimensions, values, etc.) and the compilation of multiple metric time series data points into a parquet or column-oriented file can enhance the data reduction operations, since the shared characteristics can be efficiently reduced for storage in a compressed form. Additionally, the compilation may improve the efficiency of the data retrieval. For example, if a particular attribute is sorted, lookups against that attribute can skip large chunks of data or cheaply prune column-based files that do not contain that particular attribute value.

Optionally, the data recording system 220 may generate and store an index in full fidelity data store 235, such as an index identifying one or more attributes of the metric time series data stored in one or more binary objects (e.g., parquet or column-oriented files) to allow for later identification and retrieval of the metric times series data. For example, the index may optionally store various information about the metric time series data, such as a time associated with the metric time series data or the buffering window, and/or one or more metadata or dimensions characteristics. Optionally, the data recording system 220 may generate and store an indexing information in the form of an Apache Iceberg table or database, such as where the indexing information is stored with the metric time series data itself.

A data explorer system 230 of full fidelity data storage system may be used to later identify particular metric time series data to retrieve from full fidelity data store 235, such as to direct to data quantizer system 240 for processing according to various techniques therein, such as those described above with reference to FIG. 1 and data quantizer system 140. Data explorer system 230 may generate an interface that allows user interaction to explore information about the metric time series data stored in full fidelity data store 235 and/or to identify and select one or more particular metric time series data points. For example, data explorer system 230 may access an index, optionally stored in full fidelity data store 235, that identifies one or more attributes of the metric time series data stored in full fidelity data store 235 and query the index according to one or more criteria to identify metric time series data associated with the criteria. Example criteria include, but are not limited to, a time or date, a metric name or value, a dimension name or value, a data source identifier, or the like. These or other criteria may be obtained from a remote system, assigned according to received input (e.g., user input), and/or automatically generated based on information associated with a request for metric time series data received at data explorer system 230.

Once the particular metric time series data to be retrieved from full fidelity data store 235 is identified by data explorer system 230, a request, directive, or instruction can be provided to or generated at hydration system 225 to obtain the particular metric time series data. Here, hydration system 225 can, using the index stored in full fidelity data store 235, for example, identify one or more binary objects stored in full fidelity data store 235 that contain the particular metric time series data, retrieve the binary objects, and/or decompress the binary objects as needed. In some cases, the binary objects may contain parquet or column-oriented files that store or include data for particular metric time series data, as well as other metric time series data. The hydration system 225 can then direct the particular metric time series data to the data quantizer system 240 for processing therein, while ignoring or otherwise not directing any other metric time series data contained in the parquet or column-oriented files.

The data points for the particular metric time series data can be directed to the data quantizer system 240 according to any suitable technique. In some examples, metric time series data that are directed to the data quantizer system 240 by routing system 210 can be published to a Kafka topic monitored by data quantizer system 240. Thus, the data points for the particular metric time series data can be published by the hydration system 225 to the Kafka topic, such that the data quantizer system 240 receives the data points and processes them according to pre-existing operational schemes (e.g., intake, quantization, analytics processing, etc.). In some cases, hydration system 225 may publish the data points for the particular metric time series data to the Kafka topic all at once or on a metered basis. In some examples, metering of publication of the data points for the particular metric time series data can be useful for not interrupting or not significantly impacting the ongoing processing of incoming metric time series (e.g., those metric time series data that are received in real-time by routing system 210 and filtered to data quantizer system 240), which may occur, in some cases, in the event of a large number of data points for the particular metric time series data being published to the Kafka topic. Depending on the monitoring speed, the number and rate of the data points being published to the Kafka topic by the routing system, the number of data points for the particular metric time series data, or other reasons, however, metering may not be needed.

In some cases, hydration system 225 or data explorer system 230 can optionally flag or identify the particular metric time series data such that future data points received for the particular metric time series are automatically directed to the data quantizer system, such as according to an input or attribute received from a user (e.g., as part of a query received at data explorer system). Such a flag or identification can be communicated to routing system 210, such that routing system 210 establishes or updates a filter criterion to identify the particular metric time series data, such as for automatically directing future received data points for the particular metric time series to the data quantizer system 240. Optionally, the particular metric time series can be flagged or identified by the data quantizer system 240, such as in response to an event monitor being established at data quantizer system 240, such that routing system 210 establishes or updates the filter criterion to identify the particular metric time series data.

Although not depicted in FIG. 2, full fidelity storage system 215 can include or employ other components, systems, or techniques. In one example, full fidelity storage system 215 can include a compaction service which can modify the binary objects stored in the full fidelity data store 235, such as to provide for enhanced compression, better organization, and/or removal of data points stored in the full fidelity data store 235. In some examples, a compaction system can process binary objects stored in the full fidelity data store 235 to unpack and/or recreate the metric time series data stored in the binary objects. The metric time series data can then be grouped in alternative ways, such as to group metric time series data for larger windows of time (e.g., larger than the original buffering window) together and generate new binary objects that contain the metric time series data in the reorganized form. This can allow for improvements in the compression of the binary objects stored in the full fidelity data store 235 since some amount of information for a single metric time series data may be redundantly stored in different binary objects but can be consolidated when larger time windows are used.

In another example, when a particular metric time series is identified by the data explorer system 230 for retrieval by the hydration system 225 and directed to the data quantizer system 240, the particular metric time series may no longer be needed to be stored in the full fidelity data store 235 and can be deleted. The compaction system can process binary objects stored in the full fidelity data store 235 to unpack and/or recreate the metric time series data stored in the binary objects, removing the data points for the particular metric time series and then restoring the new binary objects without the data points for the particular metric time series.

In examples, the compaction system can identify various binary objects to be removed from the full fidelity data store. For example, in some situations, the storage policies associated with full fidelity data storage system 215 may dictate that metric time series data are only to be stored to full fidelity data store 235 for a particular duration of time and after or upon expiration of that duration of time, the metric time series data should be removed from the full fidelity data store 235. As examples and without limitation, storage policies may indicate that the metric time series is to be stored to the full fidelity data store 235 for a storage policy duration of no more than 3 days, 7 days, 10 days, 14 days, 28 days, one month, one year, etc., or that the metric time series may be considered expired after it is stored for a storage policy duration of 3 days, 7 days, 10 days, 14 days, 28 days, one month, one year, etc. Depending on the organization of the binary objects storing the metric time series data, various techniques may be used for removal of the expired metric time series data. In one set of examples, the binary objects storing the metric time series data may be organized by buffering window, such that it is straightforward to delete the binary object as a whole upon or after expiration of the storage policy duration since all the metric time series data in the binary object may be expired at or about the same time. In other examples, the compaction system may read one or more binary objects from the full fidelity data store 235, such as binary objects storing the metric time series data containing data points older than a storage policy duration and data points younger than a storage policy duration, remove the older data points and write a new binary object only containing the younger points to the full fidelity data store 235.

In some examples, the compaction system can be used to layout the column-oriented files in a more efficient configuration, which may not necessarily result in improved data compression. For example, the column-oriented files may be reconfigured to a more read-friendly structure or to provide improved access. In some examples, compaction policies may be defined to inform how the files are merged together and how to lay out the resulting output in a reconfiguration by the compaction system. Optionally, these policies can be static (e.g., apply to all files) or they can be dynamic based on how the system is being used. In some examples, if a particular set of data or a particular metric time series data is frequently queried, accessed, or hydrated, it may be beneficial to reorganize that data into a different configuration in the column-oriented data files, such as to separate this data to its own or a different column-oriented data file.

In some examples, compaction can also apply various transformations to the data. One example of transformation is to summarize the data by computing percentiles, averages or applying aggregation based on time series attributes. The compacted data can then be used more efficiently than the original, raw data, and in some cases may be preferred over the raw data. In this way, the transformed data can allows for a speed up in data access and overall reduction in cost for frequently accessed data.

The present embodiments provide for storage of any or all metric time series data in a full fidelity storage system. In this way, any particular subset of the metric time series data stored in the full fidelity data storage system can be later retrieved and processed by the data quantizer system in the event such subset of metric time series data is later needed or requested, minimizing the burden associated with processing and storage of the entirety of all the metric time series data by the data quantizer system. For example, the use of cold storage for storing large quantities of metric time series data and/or packaging the metric time series data into compressed binary objects can bypass, mitigate, or otherwise avoid operational limits that may be associated with processing and storage of the large quantities of metric time series data by the data quantizer system, while still allowing the data quantizer system to have access to the large quantities of metric time series data on an as-needed or as-requested basis.

3.0. Examples of Storage of Metric Time Series in a Full Fidelity Data Storage System As described above, metric time series data can be stored to cold storage in a full fidelity data storage system to overcome operational limits associated with storing large amounts of metric time series data, allowing access to historical metric time series data on an as requested basis. This can be useful for later evaluation of metric time series data that are not actively used for event monitoring or anomaly detection where immediate access to the metric time series data are not needed and/or delays or latency associated with read back of the metric time series data from cold storage are operationally acceptable.

Figure 3:
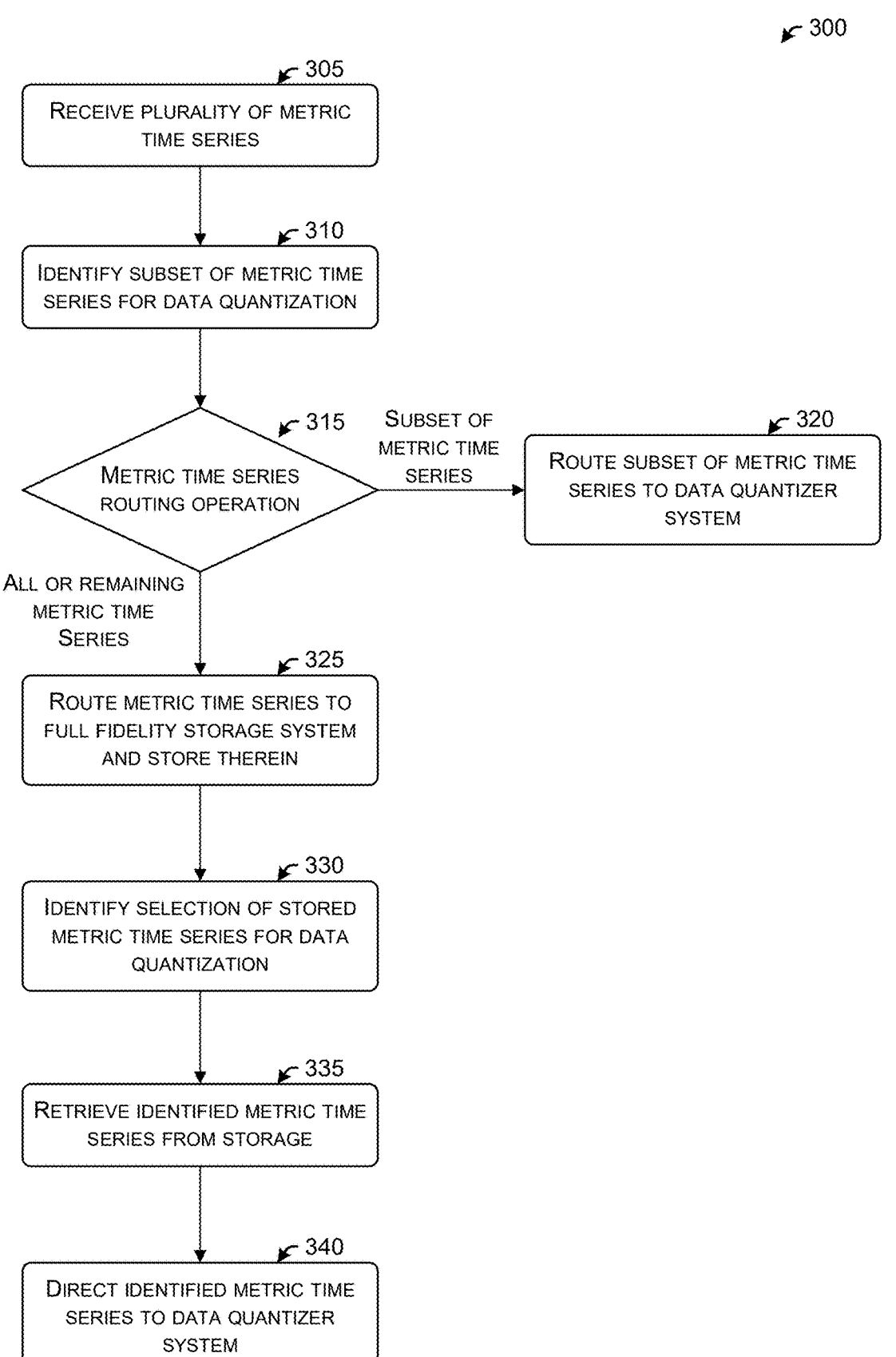
FIG. 3 provides an overview of an example process for full fidelity storage of metric time series data.

FIG. 3 provides a flow chart providing an overview of an example method 500. Method 300 may correspond to a process performed by a routing system, such as routing system 110 or routing system 210, and/or a full fidelity storage system, such as full fidelity storage system 115 or full fidelity storage system 215. Method 300 begins at 305, where a plurality of metric times series are received. As described above, the metric time series may include various metadata, various dimensions, and various metric values. For example, each metric time series may comprise a plurality of data points, with each data point including a timestamp, one or more dimensions and one or more values.

At 310, a subset of the plurality of metric time series is identified for data quantization. For example, one or more filter criteria may be obtained and used in a filtering operation. The filter criteria may identify one or more dimension values, metadata values, or other characteristics indicating that the subset of the plurality of metric time series are to be routed to a data quantizer system, for example. Optionally, the one or more filter criteria can be any type of query and may employ various query expressions (e.g., logical operations), such as to combine criteria together (e.g., AND expression), to use criteria in the alternate (e.g., OR expression), or to exclude certain criteria (e.g., NOT expression). Optionally, filter criteria may use nesting or other hierarchical grouping to provide flexibility in filtering. In some examples, the filter criteria may be obtained from a remote system or may be received as input, such as user input. Filtering the metric time series using the filter criteria may include matching one or more filter criteria to dimension values or metadata values in the metric time series.

At 315, the plurality of metric time series is subjected to a routing operation. For example, the subset of metric time series identified for data quantization are, at 320, routed to a data quantizer system. All of the plurality of metric time series, or a remainder of the plurality of metric time series other than the subset of metric time series, may be routed, at 325, to a full fidelity storage system and stored therein.

At the full fidelity storage system, the received metric time series may be stored to cold storage, for example. For example, data points for the received metric time series may be buffered during a buffering window and, upon or after expiration of the buffering window, the data points may be recorded to a data store. For example, the data may be packaged into one or more parquet or column-oriented files and stored to a blob storage system.

At 330, a selection of stored metric time series for data quantization may be identified. For example, the full fidelity storage system may provide a data explorer system, such as to allow for identification and/or selection of the stored metric time series for data quantization. For example, this may involve receiving input identifying the selection. The selection may be facilitated by access to an index, for example, identifying metadata relating to the stored metric time series.

At 335, data for the identified metric time series may be retrieved from storage. As described herein, this may involve identification of the particular binary storage object (s) storing data for the identified metric time series and subjecting the binary storage object(s) to a decompression algorithm to retrieve and expand the data for the identified metric time series. In some examples, a hydration system may facilitate the retrieval of the data for the identified metric time series.

At 340, the identified metric time series is routed to the data quantizer system. For example, the data for the identified metric time series may be sent to the data quantizer system according to the same techniques used to direct the subset of the metric time series at 320. In some examples, metric time series may be directed to the data quantizer system by publishing the data to a Kafka topic.

4.0. Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrases "at least one of X, Y or Z" or "X, Y, and/or Z" as used in general is to convey that an item, term, etc. may be include X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C. § 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method performed by a computing system, the method comprising:

receiving, by a router included in the computing system, a plurality of metric time series;

identifying by the router, based on a filtering criterion, a first subset of the plurality of metric time series for data quantization;

forwarding by the router, the first subset of the plurality of metric time series to a data quantizer system and a second subset of the plurality of metric time series to a full-fidelity storage system, the second subset of the plurality of metric time series being different than the first subset of the of the plurality of metric time series;

buffering, by the full-fidelity storage system, data points for the second subset of the plurality of metric time series received during a buffering window;

upon expiration of the buffering window, recording the data points for the second subset of the plurality of metric time series to a data store included in the full-fidelity storage system;

identifying a selection of one or more particular metric time series of the second subset of the plurality of metric time series recorded in the data store;

responsive to the selection, identifying data points for the one or more particular metric time series recorded in the data store;

responsive to the selection, transmitting, by the full-fidelity storage system, data points for the one or more particular metric time series to the data quantizer system; and combining, by an analysis engine included in the data quantizer system, the first subset of the plurality of metric time series and the data points for the one or more particular metric time series to generate an analytic data stream which identifies usage of one or more processors included in a data center, wherein the data quantizer system is further configured to: (i) associate one or more particular metric time series with occurrence of a monitored event by flagging the one or more particular metric time series, and (ii) transmit a notification to the router indicating the flagging of the one or more particular metric time series, wherein the notification causes the router to update the filtering criterion such that future data points of the one or more particular metric time series are directed by the router to the data quantizer system instead of the full-fidelity storage system.

2. The computer-implemented method of claim 1, further comprising repeating the buffering and the recording a plurality of times for a plurality of additional buffering windows.

3. The computer-implemented method of claim 1, wherein recording the data points for the second subset of the plurality of metric time series comprises packaging the data points into one or more parquet or column-oriented files and storing the one or more parquet or column-oriented files to a blob storage system.

4. The computer-implemented method of claim 1, wherein each metric time series in the plurality of metric time series comprises a plurality of data points, each data point including a timestamp and one or more data values; or wherein each metric time series in the plurality of metric time series includes one or more metadata values or one or more dimension values.

5. The computer-implemented method of claim 1, further comprising:

generating an index of time stamps, time windows, metadata values, or dimension values associated with the plurality of metric time series; and storing the index to the data store, wherein identifying the selection of the one or more particular metric time series comprises querying the index for a particular time, a particular metadata value, or a particular dimension value.

6. The computer-implemented method of claim 1, further comprising one or more of:

compacting the data points for the second subset of the plurality of metric time series recorded in the data store to reduce storage usage for the data points; or removing data points for the second subset of the plurality of metric time series recorded in the data store upon or after expiration of a data retention window.

7. A computing device, comprising:

a processor; and a non-transitory computer-readable medium having stored thereon instructions that, when executed by the processor, cause the processor to perform operations comprising:

receiving a plurality of metric time series;

identifying, based on a filtering criterion, a first subset of the plurality of metric time series for data quantization;

forwarding the first subset of the plurality of metric time series to a data quantizer system and a second subset of the plurality of metric time series to a full-fidelity storage system, the second subset of the plurality of metric time series being different than the first subset of the of the plurality of metric time series;

buffering data points for the second subset of the plurality of metric time series received during a buffering window;

upon expiration of the buffering window, recording the data points for the second subset of the plurality of metric time series to a data store;

identifying a selection of one or more particular metric time series of the second subset of the plurality of metric time series recorded in the data store;

responsive to the selection, identifying data points for the one or more particular metric time series recorded in the data store;

responsive to the selection, transmitting the data points for the one or more particular metric time series to the data quantizer system; and combining, by an analysis engine included in the data quantizer system, the first subset of the plurality of metric time series and the data points for the one or more particular metric time series to generate an analytic data stream which identifies usage of one or more processors included in a data center, wherein the data quantizer system is further configured to: (i) associate one or more particular metric time series with occurrence of a monitored event by flagging the one or more particular metric time series, and (ii) transmit a notification to the router indicating the flagging of the one or more particular metric time series, wherein the notification causes the router to update the filtering criterion such that future data points of the one or more particular metric time series are directed by the router to the data quantizer system instead of the full-fidelity storage system.

8. The computing device of claim 7, wherein the operations further comprise repeating the buffering and the recording a plurality of times for a plurality of additional buffering windows.

9. The computing device of claim 7, wherein recording the data points for the second subset of the plurality of metric time series comprises packaging the data points into one or more parquet or column-oriented files and storing the one or more parquet or column-oriented files to a blob storage system.

10. The computing device of claim 7, wherein each metric time series in the plurality of metric time series comprises a plurality of data points, each data point including a time-stamp and one or more data values; or wherein each metric time series in the plurality of metric time series includes one or more metadata values or one or more dimension values.

11. The computing device of claim 7, wherein the operations further comprise:

generating an index of time stamps, time windows, metadata values, or dimension values associated with the plurality of metric time series; and storing the index to the data store, wherein identifying the selection of the one or more particular metric time series comprises querying the index for a particular time, a particular metadata value, or a particular dimension value.

12. The computing device of claim 7, wherein the operations further comprise one or more of:

compacting the data points for the second subset of the plurality of metric time series recorded in the data store to reduce storage usage for the data points; or removing data points for the second subset of the plurality of metric time series recorded in the data store upon or after expiration of a data retention window.

13. A non-transitory computer-readable medium comprising instructions that, when executed by one or more processors, cause the one or more processors to perform operations comprising:

receiving a plurality of metric time series;

identifying, based on a filtering criterion, a first subset of the plurality of metric time series for data quantization;

forwarding the first subset of the plurality of metric time series to a data quantizer system and a second subset of the plurality of metric time series to a full-fidelity storage system, the second subset of the plurality of metric time series being different than the first subset of the of the plurality of metric time series;

buffering data points for the second subset of the plurality of metric time series received during a buffering window;

upon expiration of the buffering window, recording the data points for the second subset of the plurality of metric time series to a data store;

identifying a selection of one or more particular metric time series of the second subset of the plurality of metric time series recorded in the data store;

responsive to the selection, identifying data points for the one or more particular metric time series recorded in the data store;

responsive to the selection, transmitting the data points for the one or more particular metric time series to the data quantizer system; and combining, by an analysis engine included in the data quantizer system, the first subset of the plurality of metric time series and the data points for the one or more particular metric time series to generate an analytic data stream which identifies usage of one or more processors included in a data center, wherein the data quantizer system is further configured to: (i) associate one or more particular metric time series with occurrence of a monitored event by flagging the one or more particular metric time series, and (ii) transmit a notification to the router indicating the flagging of the one or more particular metric time series, wherein the notification causes the router to update the filtering criterion such that future data points of the one or more particular metric time series are directed by the router to the data quantizer system instead of the full-fidelity storage system.

14. The non-transitory computer-readable medium of claim 13, wherein recording the data points for the second subset of the plurality of metric time series comprises packaging the data points into one or more parquet or column-oriented files and storing the one or more parquet or column-oriented files to a blob storage system.

15. The non-transitory computer-readable medium of claim 13, wherein the operations further comprise repeating the buffering and the recording a plurality of times for a plurality of additional buffering windows.

16. The non-transitory computer-readable medium of claim 13, wherein each metric time series in the plurality of metric time series comprises a plurality of data points, each data point including a timestamp and one or more data values; or wherein each metric time series in the plurality of metric time series includes one or more metadata values or one or more dimension values.

17. The non-transitory computer-readable medium of claim 13, wherein the operations further comprise:

generating an index of time stamps, time windows, metadata values, or dimension values associated with the plurality of metric time series; and storing the index to the data store, wherein identifying the selection of the one or more particular metric time series comprises querying the index for a particular time, a particular metadata value, or a particular dimension value.

18. The non-transitory computer-readable medium of claim 13, wherein the operations further comprise one or more of:

compacting the data points for the second subset of the plurality of metric time series recorded in the data store to reduce storage usage for the data points; or removing data points for the second subset of the plurality of metric time series recorded in the data store upon or after expiration of a data retention window.

19. The computer-implemented method of claim 1, wherein the full-fidelity storage system is included in the computing system, the full-fidelity storage system being directly coupled to the router included in the computing system.

\* \* \* \* \*